United States Patent [19]
Yates

[11] 3,862,994
[45] Jan. 28, 1975

[54] PROCESS FOR CONDENSATION OF ALCOHOLS
[75] Inventor: James E. Yates, Ponca City, Okla.
[73] Assignee: Continental Oil Company, Ponca City, Okla.
[22] Filed: June 6, 1973
[21] Appl. No.: 367,690

[52] U.S. Cl.......... 260/642 C, 252/431, 260/429 R, 260/618 R, 260/642 R, 260/643 B, 260/643 D, 260/643 G, 260/681, 260/683.9
[51] Int. Cl....................... C07c 29/00, C07c 31/02
[58] Field of Search ............................... 260/642 C

[56] References Cited
UNITED STATES PATENTS
2,836,628   5/1958   Miller............................ 260/642 C
3,328,470   6/1967   Poe ................................ 260/642 C
3,479,412   11/1969  Pregaglia et al. ............... 260/642 C
3,514,493   5/1970   Pregaglia et al. ............... 260/642 C
3,642,914   2/1972   Mitchell......................... 260/642 C Primary Examiner—Joseph E. Evans
Attorney, Agent, or Firm—Ronald J. Carlson

[57] ABSTRACT

A process for producing higher molecular weight alcohols by forming a reaction mixture of at least one lower molecular weight primary alkanol having a methylene group adjacent the hydroxylated carbon atom, an alkali catalyst and a palladium salt of a β-diketone, and heating the reaction mixture to effect condensation of the alkanol while simultaneously removing water as it forms.

8 Claims, No Drawings

PROCESS FOR CONDENSATION OF ALCOHOLS

This invention relates to the condensation of alcohols to form alcohol products of higher molecular weight. More particularly, the invention relates to an improvement in the condensation of primary and/or secondary alcohols having a methylene group adjacent to the hydroxylated carbon atom to produce alcohols having a carbon content equal to the sum of the carbon atoms of the two reactant alcohols and which are branched at the beta carbon atom.

According to the well-known Guerbet reaction, a primary or secondary alcohol which contains a methylene group adjacent to the hydroxylated carbon atom may be condensed with itself or with another alcohol of the same class to form a higher alcohol containing the sum of the carbon atoms of the reactant alcohols as the principal product. The classic catalyst for the Guerbet reaction is a strong alkali such as sodium metal, which is generally in the form of its alcoholate during reaction, sodium and potassium hydroxides and the like. Many theories have been advanced as to the particular mechanism of the reaction (for example, see U.S. Pat. No. 2,004,350; U.S. Pat. No. 2,971,033; U.S. Pat. No. 2,829,177 and U.S. Pat. No. 3,558,716) and, as indicated in U.S. Pat. No. 2,762,847, there is little general agreement as to what reaction or reactions actually occur during transformation of the lower alcohols to the higher alcohols. It is further indicated that a plurality of different reactions are likely involved so that the process is highly sensitive and unpredicatable as to the effect of particular catalysts.

The overall reaction, of course, produces a reaction product mixture which not only contains the higher alcohols but also corresponding higher aldehydes and higher unsaturated alcohols and aldehydes as well as various other by-products due to side reactions. The higher aldehydes and higher unsaturated alcohols and aldehydes present little difficulty since upon hydrogenation of the reaction product they are converted to the desired higher alcohols. The other by-products which have been mentioned in the art include carboxylic acids as well as salts and esters thereof, and ordinarily it is desirable to minimize their formation. One technique for reducing by-products, which is suggested in U.S. Pat. No. 3,328,470, involves the use of less than 3 mol percent alkali catalyst and temperatures in the range of 200°–300°C while continuously removing water formed by the reaction. On the other hand, it is known that in achieving acceptable reaction rates relatively high temperatures (e.g., 290°C) and relatively large quantities of alkali catalyst must be employed, but under these conditions considerable unwanted by-products are also obtained. Thus, it was necessary to balance the reaction rate against the tolerable by-products in the standard Guerbet reaction.

Considerable activity has been involved in developing various approaches to attempt to improve the reaction rate of this process and, at the same time, reduce or at least not increase the by-products. Among the varius approaches attempted are the use of certain phosphates as cocatalysts (U.S. Pat. No. 2,762,847); the use of a particular combination catalyst mixture made up of potassium carbonate, magnesium oxide and copper chromite (U.S. Pat. No. 2,971,033); the use of various dehydrogenation catalysts (see French Pat. No. 784,656; German Pat. No. 734,468; U.S. Pat. No. 2,457,866; U.S. Pat. No. 2,757,139; U.S. Pat. No. 2,836,628; German Pat. No. 748,040; German pat. No. 911,730; German Pat. No. 855,108; German Pat. No. 855,107; and U.S. Pat. No. 2,829,177); and the use of platinum series metal (U.S. Pat. No. 3,514,493).

In addition to the above, it is indicated in U.S. Pat. No. 3,479,412 that the condensation reaction can be carried out at a temperature of the order of 100°C in a homogeneous alkaline solution by using a co-catalyst system comprising certain compounds of metals of the platinum series, which compounds are soluble in the reaction medium, together with a ligand selected from organic compounds of arsenic, antimony and phosphorus.

In accordance with this invention, it has unexpectedly been found that a significantly improved reaction rate may be obtained or, alternatively, significantly milder reaction conditions may be employed in the condensation of primary or secondary alkanols having methylene groups adjacent to the hydroxylated carbon atoms by carrying out the reaction in the presence of an alkali metal catalysts and a palladium salt of a $\beta$-diketone as the sole required co-catalyst. It is emphasized that no third catalyst component, such as a ligand, is required in carrying out the process of the invention.

The selectivity of the overall process of the invention is also maintained, as indicated by the hydrogenated product, compared with the standard Guerbet reaction. By selectivity, it is meant selectivity to the desired higher alcohols and precursors therefor such as higher aldehydes and higher unsaturated alcohols convertible to the desired higher alcohols by hydrogenation. While the remaining by-products remain the same quantitatively, their distribution is altered somewhat, namely, there is a reduction in the amount of dienes produced and an increase in higher boiling compounds. This feature is particularly advantageous when condensing alcohols of mixed carbon content since any dienes produced result in corresponding paraffins upon hydrogenation, some of which are not readily separable by simple distillation due to similarity of boiling points with the product higher alcohols. Thus, with reduced diene content there is a reduction in the paraffins which are not readily separable in such a situation.

In describing the invention in detail, the alkanols which may be used are primary or secondary alkanols having methylene groups adjacent to the hydroxylated carbon atoms. These alkanols may best be illustrated by the formula $$R-CH_2-CHOH \atop R'$$

wherein each of R and R' can be hydrogen, an aryl group, or a straight or branch chain alkyl group. Preferably, R' is hydrogen and R is an alkyl group. While there is no limitation as to the number of carbon atoms the alkyl group may contain from a theoretical standpoint, more practical considerations indicate that such alkyl group most likely will contain about 1 to 28 carbon atoms. Thus, the most preferred alkanols are those which are branch or straight chain, have 2 to 30 carbon atoms and have a methylene group adjacent the hydroxylated carbon atom. Illustrative of the above alkanols are 1-butanol; isopropyl alcohol; 1-octanol; 1-hexadecanol; 1-octadecanol; 1-eicosanol; 1-dodecanol; 1-hexacosanol; 4-methyl-pentanol-2; octanol-2; 1- tetracosanol; 1-pentanol; 1-tetradecanol; 3,3-dimethyl-1-butanol; 4-methyl-1-pentanol; 4-methyl-1-heptanol; 3-methyl-1-heptanol; 3,3-dimethyl-1-heptanol; 3,3-dimethyl-1-hexanol; 4,4-dimethyl-1-heptanol; 4,4-dimethyl-1-hexanol; 3,4-dimethyl-1-heptanol; 3,4-dimethyl-1-hexanol; phenylethanol; and the like. The alcohols may be reacted in their pure form or as mixtures. In particular, alcohol mixtures such as those generally referred to as "Oxo" alcohols having methylene groups adjacent to the hydroxylated carbon atoms are suitable as are mixtures of linear alkanols.

The condensation of the above-described alkanols to produce the higher molecular weight β-branched alcohols is effected at elevated temperatures in the presence of an alkali catalyst and a palladium salt of a β-diketone.

The alkali metal catalysts are well-known and fully described in the literature relative to Guerbet condensations of alcohols. These alkali catalysts include the alkali metals, alkali metal hydroxides, alkali metal oxides and alkali metal alcoholates. The metals, hydroxides and oxides will, of course, form the alcoholates in the reaction system wherein the hydrocarbon moieties of the alcoholate correspond to the hydrocarbon moieties of the alcohol reactants. When performed alkali metal alcoholates are used it is not necessary that they correspond with the alcohol reactants. Illustrative of suitable alkali catalysts are metallic sodium or potassium, lithium hydroxide, sodium hydroxide, potassium hydroxide, sodium oxide, potassium oxide, sodium alcoholates, potassium alcoholates, and the like. Obviously other alkali metal compounds may be used provided that they will form the corresponding alcoholates under reaction conditions. Such compounds include the alkali metal bisulfites.

The amount of alkali catalyst employed forms no part of this invention and the effects of various quantities of such catalyst are known in the art. Since large quantities of alkali catalyst lead to increased amounts of unwanted by-products and since good reaction rates are achieved by the improvement of this invention with low levels of alkali catalyst, it is normally not desirable nor is it necessary to exceed an amount of alkali catalyst equivalent to about 4 mols of the alkali metal per 100 mols of alcohol reactants. Generally, an amount of alkali catalyst equivalent to about 0.1 to 4 mols of the alkali metal per 100 mols of alcohol reactants may be employed with satisfactory results, with preferred amounts being equivalent to about 0.5 to 4 mols of the alkali metal on the same basis.

The palladium salts useful in the process of this invention are defined by the formula

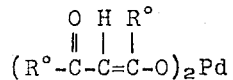

wherein each R°, independently, is a hydrocarbon group having 1 to 10 carbon atoms. Illustrative of these salts are palladium salts of β-diketones such as 2,4-pentanedione (commonly referred to as palladium acetylacetonate); 2,4-heptanedione; 3,5-heptanedione; 2,6-dimethyl-3,5-heptanedione; 2,4-nonanedione; 3,5-nonanedione; 4,6-nonanedione; 5,7-undecanedione; 2,2,6,6-tetramethyl-3,5-heptanedione; 1,3-diphenyl-1,3-propanedione; and the like.

All of the above palladium (II) salts are soluble in inert organic solvents are preferably are introduced to the alkanol reactants in the form of a solvent solution for ease of handling and dispersibility in the alkanol reactant. Since the palladium (II) salts are effective co-catalysts in very low amounts the amount of solvent introduced in this way is normally small. Of course, it is also possible to merely introduce the palladium (II) salts as is.

In general, catalytic amounts of the palladium (II) salts may be employed. Usually, this will be an amount sufficient to provide at least about 1 ppm palladium metal based on the alkanol reactants. On the upper side, the limiting considerations are economics and the fact that increased amounts of palladium generally result in increased high-boiling by-products. For these reasons one probably will not employ amounts in excess of that which will provide about 50 ppm palladium metal based on the alkanol reactants. However, it is also pointed out that increased amounts of palladium do reduce the amount of diene formed during reaction although not to the extent that it offsets the high-boiling by-products produced. Preferred amounts are those which will provide in the range of about 1 to 10 ppm palladium metal, with 1 to 5 ppm being most preferred.

The reaction can generally be carried out over a wide range of temperatures similarly as is known in connection with Guerbet reactions. These temperatures will usually range from about 80°C to 300°C, preferably from about 200°C to about 300°C. The particular temperature employed will depend upon the particular alkanol reactants, the particular alkaline condensing agent employed and other operating considerations as understood in the art.

It is essential that water initially present and that produced from the condensation reaction be removed as the reaction progresses, otherwise, the oxidation of the alcohols to carboxylic acids will be increased with a corresponding loss in alkali catalyst through subsequent neutralization of the acids. As indicated in the prior art, water removal from the Guerbet reaction may be effected by employing a dehydrating agent such as calcium oxide or magnesium oxide. However, it is preferred to remove water by azeotropic distillation. The latter procedure is particularly advantageous in the condensation of low molecular weight alcohol while operating under atmospheric and super-atmospheric pressure.

In the process of the invention, it is generally desirable to employ alkali catalysts which contain a minimum of water since any water introduced with the catalyst must be removed as pointed out above. This is not to say that no water can be so introduced and in some cases it may be very advantageous from a materials handling point of view to add the alkali catalyst in the form of a reasonably concentrated aqueous solution.

Except as the above considerations may influence the conduct of the reaction, pressure is not an essential aspect of the process. However, it is desirable to maintain the reactants in a liquid state and thus sufficient pressure will be employed where necessary to achieve this physical state.

Inert diluents may be employed in the reaction as desired and, as indicated before, may be used to introduce the palladium salts to the reaction mixture. Such diluents include hydrocarbons such as paraffins, olefins, benzene, toluene, xylene, etc.

As previously indicated, the reaction product from the condensation reaction will generally contain, in addition to the higher molecular weight saturated alcohols, higher molecular weight aldehydes and higher molecular weight unsaturated alcohols and aldehydes as well as certain minor amounts of other by-products. Because of the presence of the aldehydes and unsaturated alcohols and aldehydes, it is generally desirable to hydrogenate the reaction product before recovering the product alcohols. Standard techniques may be employed. This has the effect of converting the higher molecular weight aldehydes and unsaturated alcohols and aldehydes to the product alcohols and thus increases the overall yield of the desired product.

In recovering the product alcohols from the hydrogenated reaction product, conventional distillation techniques may be employed whereby unreacted lower molecular weight alcohols will first be separated followed by the product alcohols with the higher boiling by-products remaining behind in the distillation bottoms. When employing a single alkanol reactant any dimeric diene present in the reaction product will be converted to the corresponding paraffin upon hydrogenation and may be separated from the product higher alcohols through distillation. However, when a mixture of alcohol reactants are employed some of the dimeric dienes converted to paraffins upon hydrogenation will not be readily separable from the product higher alcohols by simple distillation due to the similarity in boiling points. This emphasizes again one of the previously mentioned advantages of the process when using mixed alkanol reactants wherein the distribution of by-products in the reaction is shifted from the dimeric dienes to the higher boiling by-products. By reducing the amount of dimeric dienes in the reaction product there results a decreased content of the contaminating paraffins in the product mixed alcohols after hydrogenation and recovery by distillation.

The invention is further illustrated by the following illustrative examples:

EXAMPLE 1

Comparative experiments were conducted to demonstrate the effectiveness of the process of the invention in significantly reducing reaction time while retaining relatively mild reaction conditions for the Guerbet reaction and in altering the distribution of by-products while substantially maintaining the selectivity of the process in producing higher alcohols and the higher saturated aldehydes, unsaturated aldehydes and unsaturated alcohols convertible to the higher alcohols upon simple hydrogenation.

The control experiment was conducted by charging 250 g (1.58 mol) of 1-decanol and 2.1 g (0.0318 mol) KOH pellets (85% KOH, 15% water) to a 500 ml three-necked flask equipped with a Dean-Stark azeotrope trap and reflux condenser, thermometer and stirrer. The reaction mixture was heated to reflux temperatures and maintained at reflux until about 8 ml water was produced and collected. This represented about 50% conversion of the 1-decanol, 1 ml water derived from the KOH pellets and 7 ml water from the condensation reaction. The time required to produce the last 7 ml of water was about 7.25 hours. The crude reaction mixture was acid washed with 25% $H_2SO_4$ followed by water washing to remove the alkali catalyst. After removing the water the entire reaction mixture was analyzed by gas chromatography which indicated about 51% by weight conversion of the 1-decanol. The reaction product analyzed as about 93% by weight saturated alcohol having 20 carbon atoms and alcohol precursor having 20 carbon atoms (saturated aldehyde and unsaturated aldehyde and alcohol), about 5% by weight dimeric diene having 20 carbon atoms and about 2% by weight higher boiling by-products.

The process of this invention was carried out according to the above procedure additionally including 1 ml of a solution of palladium acetylacetonate in benzene (1.25 mg Pd/ml) which was sufficient to provide about 5 ppm Pd based on the 1-decanol reactant. The time required to produce the last 7 ml of water was noted to be about 33 minutes. After work up of the crude reaction mixture as described in the control experiment, gas chromatography analysis was performed which showed about 54% conversion of the 1-decanol with the reaction product comprising about 92% by weight saturated alcohol having 20 carbon atoms and alcohol precursor having 20 carbon atoms, about 2% by weight dimeric diene having 20 carbon atoms and about 6% by weight higher boiling by-products.

The comparative results are set forth in Table I.

TABLE I

| Pd (ppm) | Reaction Time | Conversion (wt %) | $C_{20}$ Alcohol & Alcohol Precursor (wt %) | Diene (wt %) | HB (wt %) |
|---|---|---|---|---|---|
| 0 | 7.25 hr | 51 | 93 | 5 | 2 |
| 5 | 33 min | 54 | 92 | 2 | 6 |

EXAMPLE 2

Using the same equipment described in Example 1, 250 g of 1-decanol, 3.9 g of 45% aqueous KOH and 1 ml of a solution of palladium acetylacetonate in benzene (1.25 mg Pd/ml) were charged in that sequence to the reaction flask, heated to reflux and maintained at reflux until about 7 ml water was produced and collected beyond that which was accounted for due to the water present in the KOH. The time required to produce this last 7 ml of water was about 48 minutes. Analysis of the reaction mixture by gas chromatography indicated about 54% conversion of the 1-decanol with the reaction product analyzing as about 94% by weight saturated alcohol having 20 carbon atoms and alcohol precursor having 20 carbon atoms, about 1.6% by weight dimeric diene and about 4.5% by weight high-boiling by-products.

EXAMPLE 3

The procedure described in Example 1 was employed in carrying out an embodiment of the process of the invention except that 6.3 g of the potassium alkoxide of 1-decanol was substituted for the KOH pellets. The reaction time required to produce 7 ml of water was 42 minutes. Gas chromatography analysis of the reaction mixture indicated about 53% conversion of the 1-decanol. The reaction product analyzed as about 92.6% by weight of saturated alcohol having 20 carbon atoms and precursor therefor, about 1.6% by weight dimeric diene and about 5.8% by weight high-boiling by-products.

EXAMPLE 4

The procedure described in Example 2 was followed with the exception that the reaction mixture was allowed to stand with stirring for 5 to 6 hours at ambient temperatures prior to initiating the reaction. The time required to produce and collect 7 ml of water from the condensation reaction was about 60 minutes.

This was again repeated except that the reaction mixture was allowed to stand with stirring for about 18 hours at ambient temperatures. The time required to produce and collect 7 ml of water from the condensation reaction was about 54 minutes.

EXAMPLE 5

A series of continuous reactions were conducted in a 1 liter stainless steel reactor equipped with a stirrer, a Dean-Stark azeotrope trap, reflux condenser and a temperature recorder. In each experiment a solution of alcohol and palladium acetylacetonate in benzene (2.0 mg Pd/ml) [1 ml palladium-benzene solution/1,000 g alcohol (2 ppm) or 0.5 ml palladium-benzene solution/1,000 g alcohol (1 ppm)], was continuously metered at a specified rate into the mid-section of the reactor along with a specified rate of aqueous KOH (45%). A control run was performed omitting the palladium compound. The reactions were conducted under reflux conditions and some pressure. Water was continuously removed overhead and the reaction product was continuously withdrawn from the bottom of the reactor at a rate sufficient to provide the predetermined residence time taking into consideration the feed rates of the reactants and the overhead water removal. After each reaction reached steady-state conditions a sample of the reaction product was washed first with 25% $H_2SO_4$ and then with water followed by drying. The sample was then hydrogenated using standard techniques with a nickel/kieselguhr catalysts and then analyzed by gas chromatography for conversion and selectivity. The conditions and results of these runs are set forth in Table II.

potassium alkoxide of octanol and the palladium (II) salt of 2,4-heptanedione or 4,6-nonanedione.

EXAMPLE 8

Following the procedure of Example 3, 1-pentanol may be condensed in the presence of NaOH and the palladium (II) salt of 1,3-diphenyl-1,3-propanedione.

Thus having described the invention in detail, it will be understood by those skilled in the art that certain variations and modifications may be made without departing from the spirit and scope of the invention as defined herein or in the appended claims.

I claim:

1. A process of producing higher molecular weight hydrocarbon alcohols by condensing at least one lower molecular weight alkanol having a methylene group adjacent the hydroxylated carbon atom; said process being carried out in liquid phase at about 80° to 300°C in the presence of an alkali catalyst and a catalytic amount of a palladium salt while simultaneously removing water as it forms; said alkali catalyst being an alkali metal, alkali metal hydroxide, alkali metal oxide, alkali metal bisulfite or alkali metal hydrocarbon alcoholate; and said palladium salt being defined by

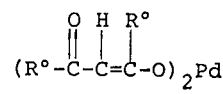

wherein each R°, independently, is a hydrocarbon group having 1 to 10 carbon atoms.

2. A process according to claim 1 wherein each R°, independently, is an alkyl group.

3. A process according to claim 2 wherein each R° is an alkyl group of different chain length.

4. A process according to claim 1 wherein the palladium salt is palladium acetylacetonate.

5. A process according to claim 4 wherein the alkali catalyst is potassium hydroxide, sodium hydroxide, potassium alcoholate, or sodium alcoholate.

6. A process according to claim 1 wherein a mixture

TABLE II

| Run Nos. | Feed Rates (ml/hr) | | Pd (Ppm) | Residence Time (Hr) | Temp (°C) | Press (psig) | Conversion (%) | Selectivity (wt%) | | |
|---|---|---|---|---|---|---|---|---|---|---|
| | Alcohol | KOH | | | | | | Product** | Paraffins*** | High Boilers |
| 1-A | 400 | 4.1 | 0 | 1 | 284 | 70 | 52 | 92.8 | 3.4 | 3.8 |
| 2-B | 400 | 4.1 | 2 | 1 | 260–264 | 40 | 51 | 93.8 | 2.2 | 4.0 |
| 3-B | 400 | 4.1 | 1 | 1 | 267–269 | 50 | 45 | 92.0 | 4.0 | 4.0 |

A - Control, no palladium compound, mixture of straight-chain 1-alkanols having 6-10 carbon atoms as feed (ALFOL 6-10 alcohol)
B - Palladium acetylacetonate/benzene and ALFOL 6-10 alcohol feed
** - Alcohol having 12-20 carbon atoms
*** - Paraffins having 12-20 carbon atoms (some of which is not readily separable by conventional distillation from the product due to similar boiling points)

EXAMPLE 6

Following the procedure in Example 3, octanol-2 and 1-octadecanol may be condensed in the presence of KOH and palladium acetylacetonate.

EXAMPLE 7

Following the procedure in Example 3, 4,4-dimethyl-1-heptanol may be condensed in the presence of the of lower molecular weight alkanols is employed.

7. A process according to claim 1 wherein the palladium salt is employed in an amount sufficient to provide at least about 1 ppm palladium metal based on the alkanol reactant.

8. A process according to claim 7 wherein the amount of palladium salt is sufficient to provide 1 to 10 ppm palladium metal based on the alkanol reactant.

* * * * *